United States Patent
Cerbini et al.

(10) Patent No.: US 6,505,298 B1
(45) Date of Patent: Jan. 7, 2003

(54) SYSTEM USING AN OS INACCESSIBLE INTERRUPT HANDLER TO RESET THE OS WHEN A DEVICE DRIVER FAILED TO SET A REGISTER BIT INDICATING OS HANG CONDITION

(75) Inventors: Christopher D. Cerbini, Raleigh, NC (US); Scott N. Dunham, Cary, NC (US); Benjamin R. Grimes, Zebulon, NC (US); Edward S. Suffern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/426,434

(22) Filed: Oct. 25, 1999

(51) Int. Cl.⁷ .................................................. G06F 9/00
(52) U.S. Cl. ............................. 713/1; 713/2; 713/100; 709/220; 709/221; 709/222
(58) Field of Search ............................... 713/1, 100, 2; 709/220, 221, 222

(56) References Cited

U.S. PATENT DOCUMENTS

| | | | | |
|---|---|---|---|---|
| 5,390,324 A | * | 2/1995 | Burckhartt et al. | 395/575 |
| 5,748,882 A | * | 5/1998 | Huang | 395/184.01 |
| 6,055,643 A | * | 4/2000 | Chaiken | 713/323 |
| 6,061,810 A | * | 5/2000 | Potter | 714/23 |
| 6,125,390 A | * | 9/2000 | Touboul | 709/223 |
| 6,125,449 A | * | 9/2000 | Taylor et al. | 713/310 |
| 6,212,592 B1 | * | 4/2001 | Klein | 710/260 |
| 6,321,289 B1 | * | 11/2001 | Engfer et al. | 710/260 |
| 6,324,644 B1 | * | 11/2001 | Rakavy et al. | 713/1 |

* cited by examiner

Primary Examiner—Thomas Lee
Assistant Examiner—Jinsong Hu
(74) Attorney, Agent, or Firm—Joseph A. Sawyer

(57) ABSTRACT

The present invention provides a method and system for providing a reset after an operating system (OS) hang condition in a computer system, the computer system including an interrupt handler not accessible by the OS. The method includes determining if an interrupt has been generated by a watchdog timer; monitoring for an OS hang condition by the interrupt handler if the interrupt has been generated and after it is known that the OS is operating; and resetting the OS if a device driver within the OS has not set a bit in a register, the bit for indicating that the OS is operating. The method and system in accordance with the present invention uses existing hardware and software within a computer system to reset the OS. The present invention uses a method by which a critical hardware watchdog periodically wakes a critical interrupt handler of the computer system. The critical interrupt handler determines if the OS is in a hang condition by polling a share hardware register that a device driver, running under the OS, will set periodically. If the critical interrupt handler does not see that the device driver has set the register bit, it will assume the OS has hung and will reset the system. In addition, the critical interrupt handler will store the reset in non-volatile memory. The reset can be logged into the system error log. Because the method and system in accordance with the present invention uses existing hardware and software within the computer system, instead of requiring an additional processor, it is cost efficient to implement while also providing a reset of the OS without human intervention.

2 Claims, 3 Drawing Sheets

SYSTEM USING AN OS INACCESSIBLE INTERRUPT HANDLER TO RESET THE OS WHEN A DEVICE DRIVER FAILED TO SET A REGISTER BIT INDICATING OS HANG CONDITION

FIELD OF THE INVENTION

The present invention relates to computer operating systems, and more particularly to the resetting of the operating systems.

BACKGROUND OF THE INVENTION

Computer operating systems are well known in the art. Occasionally, an operating system (OS) on a computer will encounter errors, either in hardware or software, from which the OS cannot recover. The only solution is for the OS to halt operation, i.e., enter a "hang" condition, and for the OS to be reset.

Several conventional methods currently exist in the art for resetting the OS. One conventional method requires human intervention. When the OS is halted, the person using the system takes action to reset the OS. For larger computer systems, such as those comprising a server, the requirement for human intervention is removed by a service processor separate from the system's processors. The service processor can sit and "watch" the activity of a server and determine if the OS has halted. If so, the service processor automates the resetting of the OS without human intervention. However, the service processor method is costly due to the additional hardware logic required for implementation. A service processor need to be installed or embedded in the computer system. In a high volume system, where cost is a major factor in the design of the system, this is not a practical option.

Another conventional method is through a "Ping" type protocol over a Local Area Network (LAN). A management console somewhere within the LAN periodically looks for a managed computer on the LAN. If the console does not receive a response from the managed computer, the console assumes the OS of the manage computer is halted and will issue a system restart via the Wake on LAN/Alert On LAN technology, developed by INTERNATIONAL BUSINSS MACHINES CORPORATION. However, this solution is also costly since additional hardware is required for implementation of the management console.

Accordingly, what is needed is an improved method and system for initiating and indicating a computer reset after an operating system hang condition. The method and system should automate the resetting of an OS when in a hang condition and also be cost efficient to implement. The present invention addresses such a need.

SUMMARY OF THE INVENTION

The present invention provides a method and system for providing a reset after an operating system (OS) hang condition in a computer system, the computer system including an interrupt handler not accessible by the OS. The method includes determining if an interrupt has been generated by a watchdog timer; monitoring for an OS hang condition by the interrupt handler if the interrupt has been generated and after it is known that the OS is operating; and resetting the OS if a device driver within the OS has not set a bit in a register, the bit for indicating that the OS is operating. The method and system in accordance with the present invention uses existing hardware and software within a computer system to reset the OS. The present invention uses a method by which a critical hardware watchdog periodically wakes a critical interrupt handler of the computer system. The critical interrupt handler determines if the OS is in a hang condition by polling a share hardware register that a device driver, running under the OS, will set periodically. If the critical interrupt handler does not see that the device driver has set the register bit, it will assume the OS has hung and will reset the system. In addition, the critical interrupt handler will store the reset in non-volatile memory. The reset can be logged into the system error log. Because the method and system in accordance with the present invention uses existing hardware and software within the computer system, instead of requiring an additional processor, it is cost efficient to implement while also providing a reset of the OS without human intervention.

DETAILED DESCRIPTION

The present invention relates to an improved method and system for initiating and indicating a computer reset after an operating system hang condition. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The method and system in accordance with the present invention uses existing hardware and software within a computer system to reset the OS. The present invention uses a method by which a critical hardware watchdog periodically wakes a critical interrupt handler of the computer system. The critical interrupt handler determines if the OS is in a hang condition by polling a share hardware register that a device driver, running under the OS, will set periodically. If the critical interrupt handler does not see that the device driver has set the register bit, it will assume the OS has hung and will reset the system. In addition, the critical interrupt handler will store the reset in non-volatile memory. The reset can be logged into the system error log. Because the method and system in accordance with the present invention uses existing hardware and software within the computer system, instead of requiring an additional processor, it is cost efficient to implement while also providing a reset of the OS without human intervention.

To more particularly describe the features of the present invention, please refer to FIGS. 1 through 3 in conjunction with the discussion below.

Figure 1:
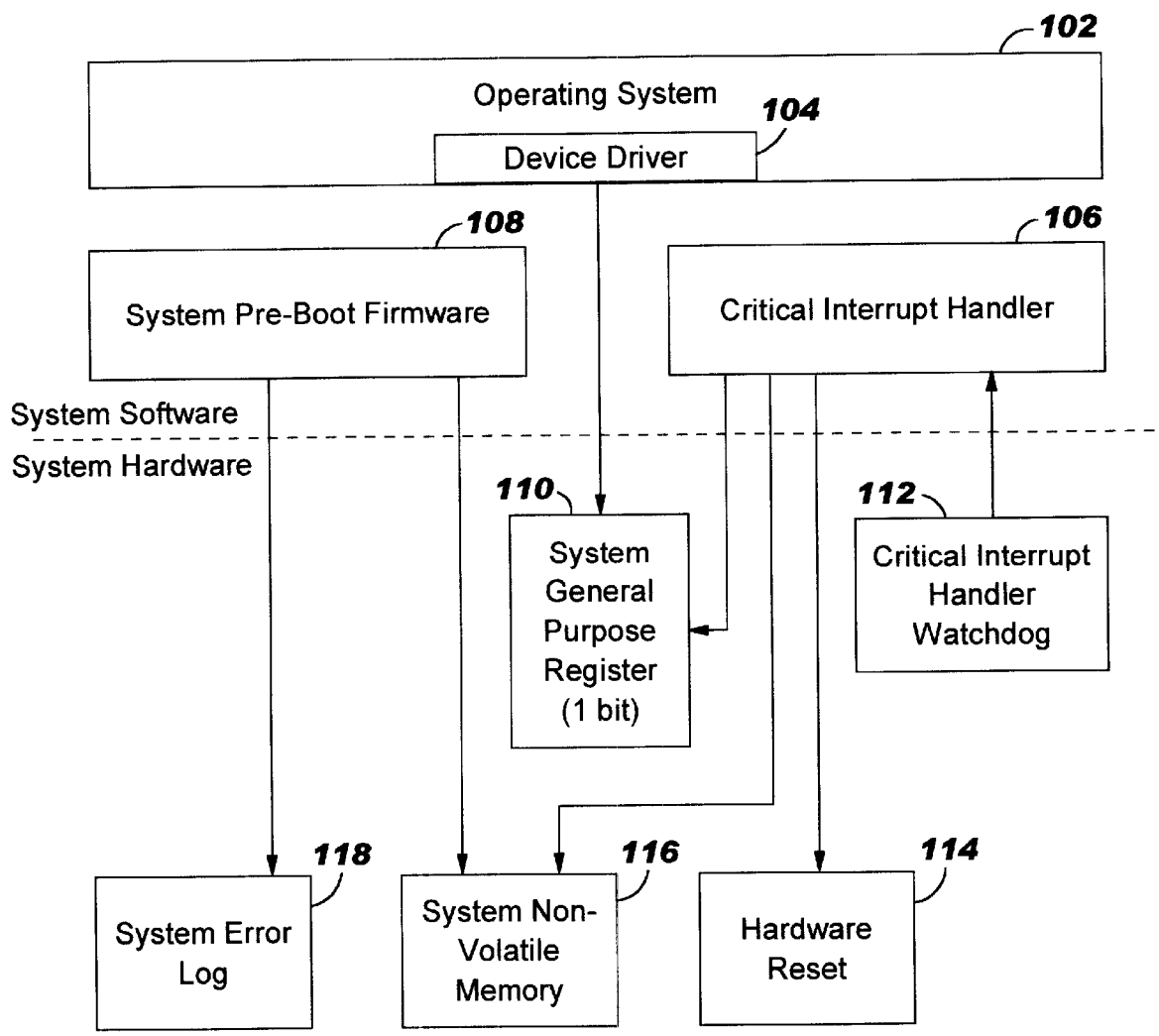
FIG. 1 is a block diagram illustrating a preferred embodiment of a computer system 100 which utilizes a method for initiating and indicating a computer reset after an operating system hang condition in accordance with the present invention.

FIG. 1 is a block diagram illustrating a preferred embodiment of a computer system 100 which utilizes a method for initiating and indicating a computer reset after an operating system hang condition in accordance with the present invention. The computer system's software comprises an OS 102 with a device driver 104 operating within the OS 102. The computer system's hardware comprises a critical interrupt handler 106 which is implemented and attached to an interrupt with the system that the OS 102 will not overwrite. For example, for processors developed by INTEL CORPORATION, the critical interrupt handler 106 is the System Management Interrupt (SMI). The SMI contains firmware level code which executes independently of the OS 102. The SMI is well known in the art and will not be discussed in detail here. The critical interrupt handler 106 is set-up by the system pre-boot firmware 108. The system pre-boot firmware 108 maintains the system error log 118. The device driver 104 is capable of setting a bit in a general purpose register 110 when the OS 102 is not in a hang condition.

Code implementing the method in accordance with the present invention is stored in the critical interrupt handler 106. The critical interrupt handler 106 is initiated periodically by the critical interrupt handler watchdog 112. The critical interrupt handler 106 checks the bit 110 in the general purpose register to determine if the device driver 104 has set it. If not, then the critical interrupt handler 106 assumes that the OS 102 has hung, and issues a hardware reset 114. The fact that a reset occurred is stored in non-volatile memory 116. The system pre-boot firmware 108 then writes the reset in the system error log 118.

Figure 2:
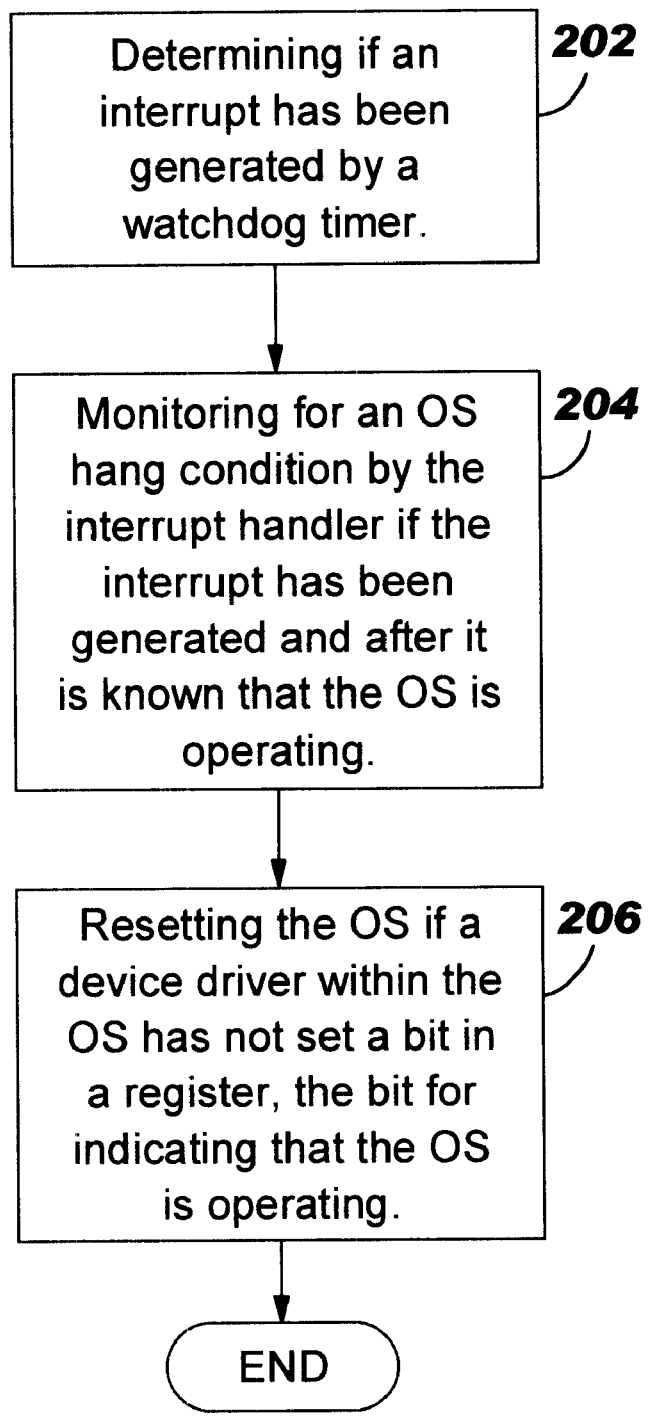
FIG. 2 is a flow chart illustrating a preferred embodiment of a method for initiating and indicating a computer reset after an operating system hang condition in accordance with the present invention.

FIG. 2 is a flow chart illustrating a preferred embodiment of a method for initiating and indicating a computer reset after an operating system hang condition in accordance with the present invention. First, whether an interrupt has been generated by a watchdog timer is determined, via step 102. In the preferred embodiment, the watchdog timer is part of the critical interrupt handler watchdog 112 which initiates the critical interrupt handler 106. Next, an OS hang condition is monitored by the interrupt handler 106 if the interrupt has been generated and after it is known that the OS 102 is operating, via step 104. Monitoring after it is known that the OS 102 is operating avoids the situation where the loading of the OS 102 is misinterpreted as a hang condition. Resetting the OS 102 in this situation would prevent the OS 102 from ever loading. If a system device driver 104 within the OS 102 has not set a bit 110 in a register, where the bit 110 indicates that the OS 102 is operating, then the OS 102 is reset, via step 106. In the preferred embodiment, as long as the OS 102 has not hung, the device driver 104 may continue to set the bit 110 whenever it receives a time slice from the OS 102. Thus, when the bit 110 is not set by the device driver 104 within a particular time period, then the OS 102 is assumed to have hung and prevented the device driver 104 from setting the bit 110. If the bit 110 is not set, then the critical interrupt handler 106 issues a hardware reset 114.

Figure 3:
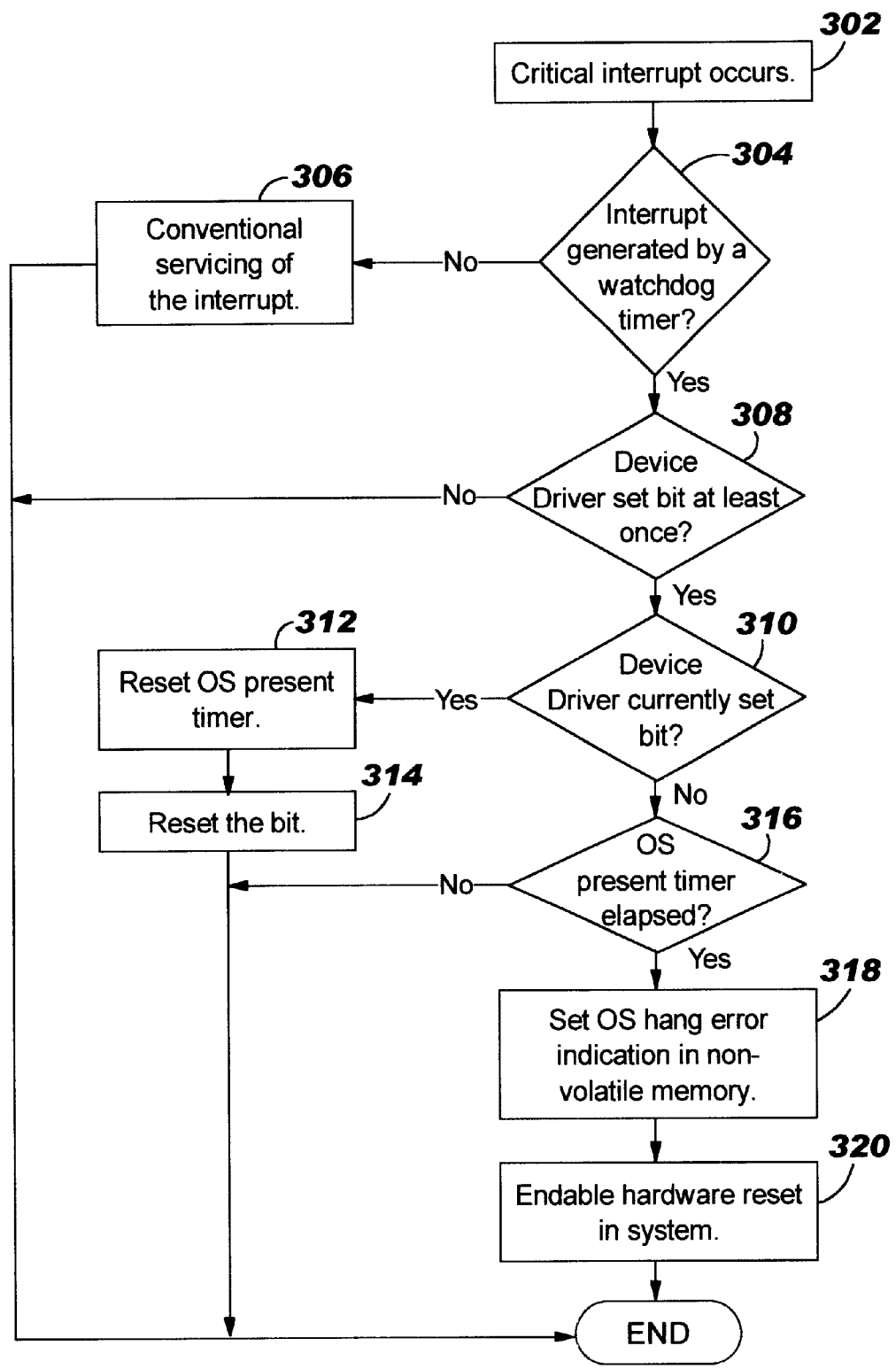
FIG. 3 is a flow chart illustrating in more detail the preferred embodiment of the method for initiating and indicating a computer reset after an operating system hang condition in accordance with the present invention.

FIG. 3 is a flow chart illustrating in more detail the preferred embodiment of the method for initiating and indicating a computer reset after an operating system hang condition in accordance with the present invention. First, a critical interrupt occurs, via step 302. Since the critical interrupt can occur for multiple reasons, such as for hardware failures, it is determined if the interrupt was generated by a watchdog timer of the critical interrupt handler watchdog 112, via step 304. If not, then conventional servicing of the interrupt is performed, via step 306. If the interrupt was generated by the watchdog timer, then it is determined if the device driver 104 has set the bit 110 at least once, via step 308. Waiting for the device driver 104 to set the bit 110 at least once ensures that the OS 102 and the device driver 104 are initially running properly before any monitoring is performed. It avoids the situation where the system is reset while the OS 102 is loading, thus the OS 102 is never given the chance to load. If the device driver 104 has not set the bit 110 at least once, then no monitoring is performed. If the device driver 104 has set the bit 110 at least once, then it is determined if the device driver 104 has currently set the bit 110, via step 310. In the preferred embodiment, if the device driver 104, and thus the OS 102, is running, then the device driver 104 sets the bit 110 to indicate that it is still alive. Since the OS 102 may be heavily used, the critical interrupt handler 106 waits for an appropriate amount of time to see if the device driver 104 sets the bit 110 before assuming the OS 102 has hung. This amount of time is maintained by an OS present timer. If the OS 102 has hung, then the device driver 104 would not be able to set the bit 110. If the device driver 104 did set the bit 110, then the OS present timer and the bit 110 are reset, via steps 312 and 314. If the device driver 104 has not set the bit 110, then it is determined if the OS present timer has elapsed, via step 316. If the OS present timer has not elapsed, then no further action is performed by the critical interrupt handler 106. If it has, then an OS hang condition is assumed. The OS hang error is indicated in the non-volatile memory 116, via step 320, and a hardware reset 114 is enabled, via step 322.

An improved method and system for initiating and indicating a computer reset after an operating system hang condition has been disclosed. The method and system in accordance with the present invention uses existing hardware and software within a computer system to reset the OS. The present invention uses a method by which a critical hardware watchdog periodically wakes a critical interrupt handler of the computer system. The critical interrupt handler determines if the OS is in a hang condition by polling a share hardware register that a device driver, running under the OS, will set periodically. If the critical interrupt handler does not see that the device driver has set the register bit, it will assume the OS has hung and will reset the system. In addition, the critical interrupt handler will store the reset in non-volatile memory. The reset can be logged into the system error log. Because the method and system in accordance with the present invention uses existing hardware and software within the computer system, instead of requiring an additional processor, it is cost efficient to implement while also providing a reset of the OS without human intervention.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A computer system, comprising:

an operating system (OS);

a device driver functioning within the OS;

a bit in a register, the register coupled to the device driver, the bit indicating that the OS is operating;

an interrupt handler coupled to the register, the interrupt handler not being accessible by the OS;

a watchdog timer coupled to the interrupt handler for initiating the interrupt handler;

a hardware reset coupled to the interrupt handler for resetting the OS when the interrupt handler determines that the device driver did not set the bit; and a system non-volatile memory coupled to the interrupt handler for indicating an OS hang error.

2. The system of claim 1, further comprising:

a system pre-boot firmware coupled to the system non-volatile memory; and a system error log coupled to the system pre-boot firmware, wherein the system pre-boot firmware writes the OS hang error indication to the system error log.

* * * * *